United States Patent
Hart et al.

(10) Patent No.: US 10,337,589 B2
(45) Date of Patent: Jul. 2, 2019

(54) MULTI-SPEED TRANSMISSION

(71) Applicant: GM Global Technology Operations LLC, Detroit, MI (US)

(72) Inventors: James M. Hart, Belleville, MI (US); Elizabeth I. Wooden, Farmington Hills, MI (US); Scott H. Wittkopp, Ypsilanti, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 276 days.

(21) Appl. No.: 15/484,612

(22) Filed: Apr. 11, 2017

(65) Prior Publication Data

US 2017/0219063 A1    Aug. 3, 2017

Related U.S. Application Data

(63) Continuation of application No. 14/640,798, filed on Mar. 6, 2015, now Pat. No. 9,651,118.

(60) Provisional application No. 61/968,156, filed on Mar. 20, 2014.

(51) Int. Cl.
*F16H 3/44* (2006.01)
*F16H 3/66* (2006.01)

(52) U.S. Cl.
CPC ............... *F16H 3/66* (2013.01); *F16H 3/663* (2013.01); *F16H 2003/442* (2013.01); *F16H 2200/0069* (2013.01); *F16H 2200/201* (2013.01); *F16H 2200/2012* (2013.01); *F16H 2200/2023* (2013.01); *F16H 2200/2046* (2013.01)

(58) Field of Classification Search
CPC ....... F16H 2200/2023; F16H 2200/201; F16H 2200/0069; F16H 2200/2046; F16H 3/663
See application file for complete search history.

(56) References Cited

U.S. PATENT DOCUMENTS

| | | | |
|---|---|---|---|
| 2,929,271 | A | 3/1960 | Miller |
| 3,381,546 | A | 5/1968 | Holl |
| 7,604,564 | B2 | 10/2009 | Klemen |
| 7,727,104 | B2 | 6/2010 | Shim |
| 7,780,566 | B2 | 8/2010 | Seo |
| 8,007,398 | B2 | 8/2011 | Phillips et al. |
| 8,197,375 | B1 | 6/2012 | Hart et al. |
| 8,277,355 | B2 | 10/2012 | Hart et al. |
| 8,343,007 | B2 | 1/2013 | Hart et al. |
| 8,353,801 | B2 | 1/2013 | Hart et al. |
| 8,512,196 | B2 | 8/2013 | Mellet et al. |
| 8,523,729 | B2 | 9/2013 | Hart et al. |
| 8,652,004 | B2 | 2/2014 | Herbeth et al. |
| 8,715,130 | B2 | 5/2014 | Mellet et al. |
| 8,758,185 | B2 | 6/2014 | Mellet et al. |
| 8,894,534 | B2 | 11/2014 | Mellet et al. |
| 8,951,160 | B2 | 2/2015 | Vernon et al. |
| 9,074,663 | B2 | 7/2015 | Mellet et al. |
| 2010/0216591 | A1 | 8/2010 | Wittkopp et al. |
| 2012/0088625 | A1 | 4/2012 | Phillips et al. |
| 2014/0357434 | A1 | 12/2014 | Lundberg |

(Continued)

*Primary Examiner* — Sherry L Estremsky

(57) ABSTRACT

A transmission is provided having an input member, an output member, at least three planetary gear sets, a plurality of interconnecting members and six torque transmitting mechanisms. The torque transmitting mechanisms include clutches and brakes that are actuatable in combinations of three to establish at least ten forward gear ratios and at least one reverse gear ratio.

20 Claims, 4 Drawing Sheets

(56) References Cited

U.S. PATENT DOCUMENTS

2015/0038282 A1   2/2015  Otake et al.
2017/0314650 A1*  11/2017 Jinnai ................. F16D 25/0638
2018/0073611 A1*  3/2018  Beck ...................... B60K 6/365

* cited by examiner

| GEAR STATE | GEAR RATIO | RATIO STEP | TORQUE TRANSMITTING MECHANISMS ||||||
|---|---|---|---|---|---|---|---|---|
| | | | 30 | 32 | 26 | 24 | 22 | 28 |
| REV | -4.193 | | | X | X | | X | |
| N | | -0.89 | | | | | | |
| 1ST | 4.724 | | | X | X | X | | |
| 2ND | 3.243 | 1.46 | X | X | | X | | |
| 3RD | 2.397 | 1.35 | X | X | X | | | |
| 4TH | 1.920 | 1.25 | | X | | | X | X |
| 4TH | 1.920 | | | X | | X | | X |
| 4TH | 1.920 | | | X | X | | | X |
| 4TH | 1.920 | | X | X | | | | X |
| 5TH | 1.468 | 1.31 | X | | X | | | X |
| 6TH | 1.176 | 1.25 | X | | | X | | X |
| 7TH | 1.000 | 1.18 | | | | X | X | X |
| 7TH | 1.000 | | | | X | | X | X |
| 7TH | 1.000 | | | | X | X | | X |
| 7TH | 1.000 | | | | X | X | X | |
| 8TH | 0.820 | 1.22 | X | | | | X | X |
| 9TH | 0.687 | 1.20 | X | | | X | X | |
| 10TH | 0.639 | 1.07 | X | | X | | X | |
| OVERALL RATIO | | 7.40 | | | | | | |

X = ON - ENGAGED CARRYING TORQUE

FIG. 7

MULTI-SPEED TRANSMISSION

CROSS-REFERENCE TO RELATED APPLICATIONS

This application is a continuation of U.S. patent application Ser. No. 14/640,798 filed Mar. 6, 2015 which claims the benefit of U.S. Provisional Application No. 61/968,156 filed Mar. 20, 2014. The disclosure of the above applications are incorporated herein by reference.

FIELD

The invention relates generally to a multiple speed transmission, and more particularly, to a transmission having a plurality of speeds, three or four planetary gear sets and a plurality of torque transmitting devices.

BACKGROUND

The statements in this section merely provide background information related to the present disclosure and may or may not constitute prior art.

A typical multiple speed transmission uses a combination of friction clutches, planetary gear arrangements and fixed interconnections to achieve a plurality of gear ratios. The number and physical arrangement of the planetary gear sets, generally, are dictated by packaging, cost and desired speed ratios.

While current transmissions achieve their intended purpose, the need for new and improved transmission configurations which exhibit improved performance, especially from the standpoints of efficiency, responsiveness and smoothness, and improved packaging, primarily reduced size and weight, is essentially constant. Accordingly, there is a need for an improved, cost-effective, compact multiple speed transmission.

SUMMARY

A transmission for a motor vehicle is provided. The transmission includes an input member, an output member, a first planetary gear set having first, second, third, and fourth members, a second planetary gear set having first, second, and third members, a third planetary gear set having first, second, and third members, a first interconnecting member directly connected to the second member of the first planetary gear set and to the second member of the second planetary gear set, a second interconnecting member directly connected to the first member of the second planetary gear set and the second member of the third planetary gear set, and six torque transmitting mechanisms selectively engageable to connect each of the first, second, third, and fourth members of the first, second, and third planetary gear sets with another of the first, second, third, and fourth members and a stationary member. The six torque transmitting mechanisms are engaged in combinations of at least three to provide at least ten forward speed ratios and a reverse speed ratio between the input member and the output member.

In one aspect of the present invention, a first of the six torque transmitting mechanisms is selectively engageable to connect the third member of the first planetary gear set with the first member of the third planetary gear set.

In another aspect of the present invention, a second of the six torque transmitting mechanisms is selectively engageable to connect the third member of the first planetary gear set with the third member of the third planetary gear set.

In another aspect of the present invention, a third of the six torque transmitting mechanisms is selectively engageable to connect the fourth member of the first planetary gear set with the third member of the third planetary gear set.

In another aspect of the present invention, a fourth of the six torque transmitting mechanisms is selectively engageable to connect the third member of the second planetary gear set with the third member of the third planetary gear set.

In another aspect of the present invention, a fifth of the six torque transmitting mechanisms is selectively engageable to connect the first member of the first planetary gear set to the stationary member.

In another aspect of the present invention, a sixth of the six torque transmitting mechanisms is selectively engageable to connect the first member of the third planetary gear set to the stationary member.

In another aspect of the present invention, the input member is connected for common rotation to the second member of the first planetary gear set and the second member of the second planetary gear set.

In another aspect of the present invention, the output member is connected for common rotation to the first member of the second planetary gear set and the second member of the third planetary gear set.

In another aspect of the present invention, the first member of the first planetary gear set is a sun gear member, the second member of the first planetary gear set is a ring gear member, the third member of the first planetary gear set is a carrier member, the fourth member of the first planetary gear set is a ring and sun gear member, the first members of the second and third planetary gear sets are ring gear members, the second members of the second and third planetary gear sets are carrier members, and the third members of the second and third planetary gear sets are sun gear members.

In another aspect of the present invention, the first planetary gear set is a stacked planetary gear set having first and second sets of planetary gears supported for rotation by the carrier member, and wherein the first set of planetary gears is in mesh with the sun gear member and the ring and sun gear member and the second set of planetary gears is in mesh with the ring and sun gear member and with the ring gear member.

In another aspect of the present invention, the first member of the first planetary gear set is a first sun gear member, the second member of the first planetary gear set is a carrier member, the third member of the first planetary gear set is a ring gear member, the fourth member of the first planetary gear set is a second sun gear member, the first members of the second and third planetary gear sets are ring gear members, the second members of the second and third planetary gear sets are carrier members, and the third members of the second and third planetary gear sets are sun gear members.

In another aspect of the present invention, the first planetary gear set includes a set of long planetary gears and a set of short planetary gears each supported by the carrier member, and wherein the long planetary gears are each in mesh with the first sun gear member, the ring gear member, and the short planetary gears, and wherein the short planetary gears are each in mesh with the long planetary gears and the second sun gear member.

In another aspect of the present invention, the first planetary gear set includes a set of stepped planetary gears each having a large diameter portion and a small diameter portion and includes a set of non-stepped planetary gears, wherein each of the stepped planetary gears are meshed with the first sun gear member at the large diameter portion and are each meshed with both the ring gear member and the non-stepped planetary gears at the small diameter portion, and wherein each of the non-stepped planetary gears are meshed with both the stepped planetary gears and the second sun gear member.

In another aspect of the present invention, the first planetary gear set includes a set of long planetary gears and a set of short planetary gears each supported by the carrier member, and wherein the long planetary gears are each in mesh with the second sun gear member and the short planetary gears, and wherein the short planetary gears are each in mesh with the long planetary gears, the first sun gear member, and the ring gear member.

Further features, aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

FIG. 7 is a truth table presenting an example of a state of engagement of various torque transmitting elements to produce multiple forward and at least one reverse speed or gear ratios of the transmissions illustrated in FIGS. 1-6.

DETAILED DESCRIPTION

The following description is merely exemplary in nature and is not intended to limit the present disclosure, application, or uses.

Figure 1:
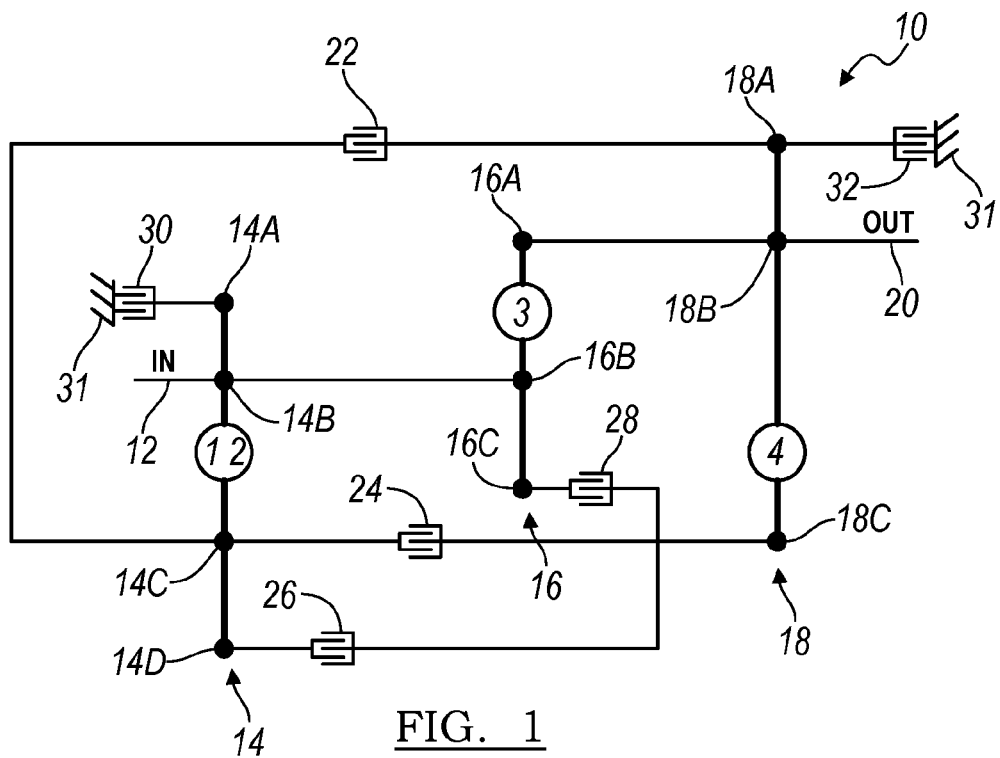
FIG. 1 is a lever diagram of a transmission according to the principles of present invention.

Referring now to FIG. 1, an embodiment of a multi-speed transmission 10 is illustrated in a lever diagram format. A lever diagram is a schematic representation of the components of a mechanical device such as an automatic transmission. Each individual lever represents a planetary gear set wherein the three basic mechanical components of the planetary gear are each represented by a node. Therefore, a single lever contains three nodes: one for the sun gear, one for the planet gear carrier, and one for the ring gear. In some cases, two levers may be combined into a single lever having more than three nodes (typically four nodes). For example, if two nodes on two different levers are interconnected through a fixed connection they may be represented as a single node on a single lever. The relative length between the nodes of each lever can be used to represent the ring-to-sun ratio of each respective gear set. These lever ratios, in turn, are used to vary the gear ratios of the transmission in order to achieve an appropriate ratios and ratio progression. Mechanical couplings or interconnections between the nodes of the various planetary gear sets are illustrated by thin, horizontal lines, and torque transmitting devices such as clutches and brakes are presented as interleaved fingers. Further explanation of the format, purpose and use of lever diagrams can be found in SAE Paper 810102, "The Lever Analogy: A New Tool in Transmission Analysis" by Benford and Leising which is hereby fully incorporated by reference.

The multi-speed transmission 10 includes an input shaft or member 12, a first gear set assembly 14, a second gear set assembly 16, a third gear set assembly 18, and an output shaft or member 20. In the lever diagram of FIG. 1, the first gear set assembly 14 has four nodes: a first node 14A, a second node 14B, a third node 14C, and a fourth node 14D. The second gear set assembly 16 has three nodes: a first node 16A, a second node 16B and a third node 16C. The third gear set assembly 18 has three nodes: a first node 18A, a second node 18B and a third node 18C. The input member 12 is continuously coupled to the second node 14B of the first gear set assembly 14 and to the second node 16B of the second gear set assembly 16. The output member 20 is continuously coupled to the second node 18B of the third gear set assembly 18 and to the first node 16A of the second gear set assembly 16.

A first clutch 22 selectively connects the third node 14C of the first gear set assembly 14 with the first node 18A of the third gear set assembly 18. A second clutch 24 selectively connects the third node 14C of the first gear set assembly 14 with the third node 18C of the third gear set assembly 18. A third clutch 26 selectively connects the fourth node 14D of the first gear set assembly 14 with the third node 18C of the third gear set assembly 18. A fourth clutch 28 selectively connects the third node 16C of the second gear set assembly 16 with the third node 18C of the third gear set assembly 18. A first brake 30 selectively connects the first node 14A of the first gear set assembly 14 with a stationary member or element 31, such as a transmission housing, in order to restrict rotation of the first node 14A of the first gear set assembly 14. A second brake 32 selectively connects the first node 18A of the third gear set assembly 18 with the stationary member 31 in order to restrict rotation of the first node 18A of the third gear set assembly 18.

Figure 2:
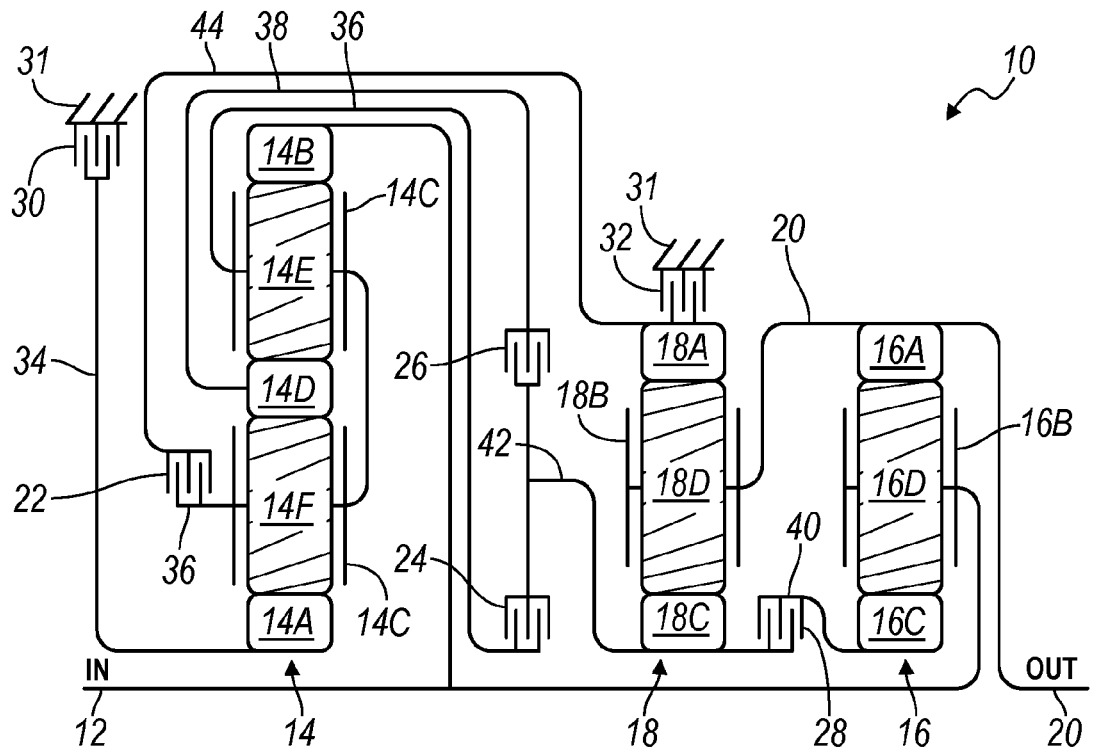
FIG. 2 is a diagrammatic illustration of an embodiment of the transmission of FIG. 1 according to the principles of the present invention.

Referring now to FIG. 2, a stick diagram presents a schematic layout of an embodiment of the multi-speed transmission 10 according to the principles of the present invention. In FIG. 2, the numbering from the lever diagram of FIG. 1 is carried over. The clutches and couplings are correspondingly presented whereas the nodes of the gear set assemblies now appear as components of planetary gear sets such as sun gears, ring gears, planet gears and planet gear carriers.

For example, the first gear set assembly 14 is configured as a radially stacked planetary gear set having a sun gear member 14A, a planet gear carrier member 14C, a ring gear member 14B, and a sun/ring common gear member 14D that are all radially aligned. The common gear member 14D has gear teeth on an inner surface, forming a ring gear, and gear teeth on an outer surface, forming a sun gear. The carrier member 14C rotatably supports a first set of planet or pinion gears 14E (only one of which is shown) and a second set of planet or pinion gears 14F (only one of which is shown). The first set of planet gears 14E are each configured to intermesh with both the ring gear member 14B and the common gear member 14D. The second set of planet gears 14F are each configured to intermesh with both the common gear member 14D and the sun gear member 14A. The sun gear member 14A is connected for common rotation with a first shaft or interconnecting member 34. The planet gear carrier 14C is connected for common rotation with a second shaft or interconnecting member 36. The common gear member 14D is connected for common rotation with a third shaft or interconnecting member 38. The ring gear 14B is connected for common rotation with the input shaft or member 12.

The second gear set assembly 16 includes a sun gear member 16C, a planet gear carrier member 16B, and a ring gear member 16A. The planet gear carrier member 16B rotatably supports a set of planet or pinion gears 16D (only one of which is shown). The planet gears 16D are each configured to intermesh with both the sun gear member 16C and the ring gear member 16A. The sun gear member 16C is connected for common rotation with a fourth shaft or interconnecting member 40. The carrier member 16B is connected for common rotation with the input shaft or member 12. The ring gear member 16A is connected for common rotation with the output shaft or member 20.

The third gear set assembly 18 includes a sun gear member 18C, a planet gear carrier member 18B, and a ring gear member 18A. The planet gear carrier member 18B rotatably supports a set of planet or pinion gears 18D (only one of which is shown). The planet gears 18D are each configured to intermesh with both the sun gear member 18C and the ring gear member 18A. The sun gear member 18C is connected for common rotation with a fifth shaft or interconnecting member 42. The carrier member 18B is connected for common rotation with the output shaft or member 20. The ring gear member 18A is connected for common rotation with a sixth shaft or interconnecting member 44.

The input shaft or member 12 is continuously connected to an input source, such as an engine (not shown) or a turbine of a torque converter (not shown). The output shaft or member 20 is continuously connected with a motor vehicle output such as a final drive unit or transfer case (not shown).

The torque-transmitting mechanisms, including the first, second, third, and fourth clutches 22, 24, 26, 28 and first and second brakes 30, 32 allow for selective interconnection of the shafts or interconnecting members 34, 36, 38, 40, 42, 44 to other shafts or interconnecting members 34, 36, 38, 40, 42, 44, the members of the planetary gear sets 14, 16, 18, or the stationary member or transmission housing 31. For example, the first clutch 22 is selectively engageable to connect the second interconnecting member 36 with the sixth interconnecting member 44. The second clutch 24 is selectively engageable to connect the second interconnecting member 36 with the fifth interconnecting member 42. The third clutch 26 is selectively engageable to connect the third interconnecting member 38 with the fifth interconnecting member 42. The fourth clutch 28 is selectively engageable to connect the fourth interconnecting member 40 with the fifth interconnecting member 42. The first brake 30 is selectively engageable to connect the first interconnecting member 34 to the stationary member or transmission housing 31 in order to restrict the sun gear member 14A from rotating relative to the housing 31. The second brake 32 is selectively engageable to connect the sixth interconnecting member 44 to the stationary member or transmission housing 31 in order to restrict rotation of the ring gear member 18A.

Figure 3:
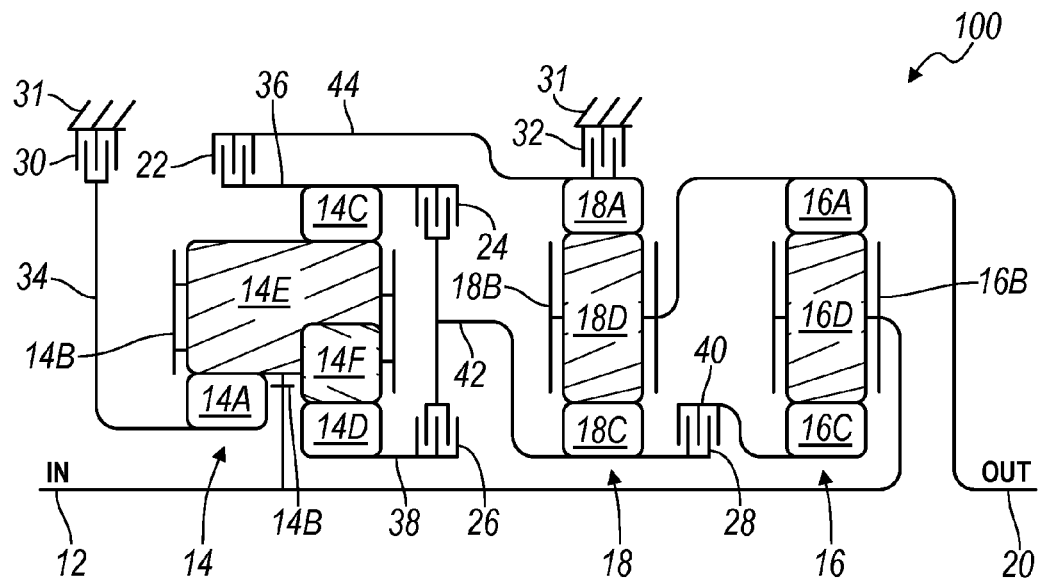
FIG. 3 is a diagrammatic illustration of another embodiment of the transmission of FIG. 1 according to the principles of the present invention.

Referring now to FIG. 3, a stick diagram presents a schematic layout of another embodiment of a multi-speed transmission 100 according to the principles of the present invention. In FIG. 3, the numbering from the diagrams of FIGS. 1 and 2 are carried over. The clutches and couplings are correspondingly presented while the nodes of the gear set assemblies 14, 16, and 18 may now correspond to different components of planetary gear sets from those illustrated in FIG. 2.

For example, the first gear set assembly 14 is configured as a Ravigneaux planetary gear set having a first sun gear member 14A, a second sun gear member 14D, a planet gear carrier member 14B, and a ring gear member 14C. The carrier member 14B rotatably supports a set of long planet or pinion gears 14E (only one of which is shown) and a set of short planet or pinion gears 14F (only one of which is shown). The set of long planet gears 14E are each configured to intermesh with the ring gear member 14C, the sun gear member 14A and the short planet gears 14F. The short set of planet gears 14F are each configured to intermesh with both the sun gear member 14D and the long planet gears 14E. The sun gear member 14A is connected for common rotation with the first shaft or interconnecting member 34. The ring gear member 14C is connected for common rotation with the second shaft or interconnecting member 36. The sun gear member 14D is connected for common rotation with a third shaft or interconnecting member 38. The carrier member 14B is connected for common rotation with the input shaft or member 12.

The second gear set assembly 16 includes a sun gear member 16C, a planet gear carrier member 16B, and a ring gear member 16A. The planet gear carrier member 16B rotatably supports a set of planet or pinion gears 16D (only one of which is shown). The planet gears 16D are each configured to intermesh with both the sun gear member 16C and the ring gear member 16A. The sun gear member 16C is connected for common rotation with the fourth shaft or interconnecting member 40. The carrier member 16B is connected for common rotation with the input shaft or member 12. The ring gear member 16A is connected for common rotation with the output shaft or member 20.

The third gear set assembly 18 includes a sun gear member 18C, a planet gear carrier member 18B, and a ring gear member 18A. The planet gear carrier member 18B rotatably supports a set of planet or pinion gears 18D (only one of which is shown). The planet gears 18D are each configured to intermesh with both the sun gear member 18C and the ring gear member 18A. The sun gear member 18C is connected for common rotation with a fifth shaft or interconnecting member 42. The carrier member 18B is connected for common rotation with the output shaft or member 20. The ring gear member 18A is connected for common rotation with a sixth shaft or interconnecting member 44.

The input shaft or member 12 is continuously connected to an input source, such as an engine (not shown) or a turbine of a torque converter (not shown). The output shaft or member 20 is continuously connected with a motor vehicle output such as a final drive unit or transfer case (not shown).

The torque-transmitting mechanisms, including the first, second, third, and fourth clutches 22, 24, 26, 28 and first and second brakes 30, 32 allow for selective interconnection of the shafts or interconnecting members 34, 36, 38, 40, 42, 44 to other shafts or interconnecting members 34, 36, 38, 40, 42, 44, the members of the planetary gear sets 14, 16, 18, or the stationary member or transmission housing 31. For example, the first clutch 22 is selectively engageable to connect the second interconnecting member 36 with the sixth interconnecting member 44. The second clutch 24 is selectively engageable to connect the second interconnecting member 36 with the fifth interconnecting member 42. The third clutch 26 is selectively engageable to connect the third interconnecting member 38 with the fifth interconnecting member 42. The fourth clutch 28 is selectively engageable to connect the fourth interconnecting member 40 with the fifth interconnecting member 42. The first brake 30 is selectively engageable to connect the first interconnecting member 34 to the stationary member or transmission housing 31 in order to restrict the sun gear member 14A from rotating relative to the housing 31. The second brake 32 is selectively engageable to connect the sixth interconnecting member 44 to the stationary member or transmission housing 31 in order to restrict rotation of the ring gear member 18A.

Figure 4:
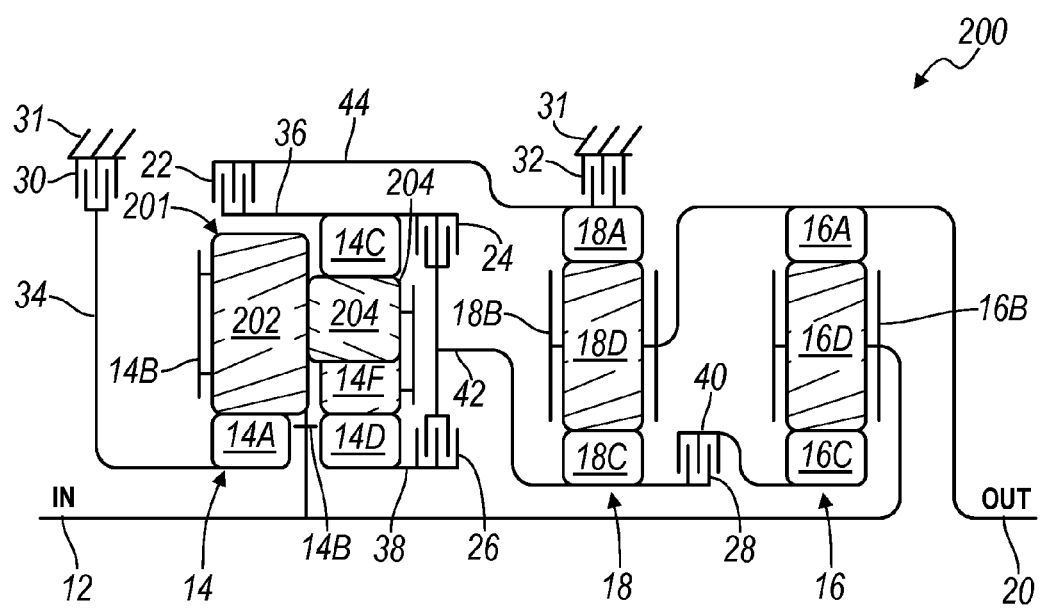
FIG. 4 is a diagrammatic illustration of yet another embodiment of the transmission of FIG. 1 according to the principles of the present invention.

Referring now to FIG. 4, a stick diagram presents a schematic layout of another embodiment of a multi-speed transmission 200 according to the principles of the present invention. In FIG. 4, the numbering from the diagrams of FIGS. 1 and 3 are carried over. However, in the transmission 200, the planet gears or pinions 14E are configured as stepped pinion gears 201 having a larger diameter portion 202 and a small diameter portion 204. The large diameter portions 202 of each of the stepped planet gears 201 are intermeshed with the sun gear member 14A. The small diameter portions 204 of each of the stepped planet gears 201 are intermeshed with both the ring gear member 14C and the planet gears 14F. The planet gears 14F are each intermeshed with both the stepped planet gears 201 and the sun gear member 14D.

Figure 5:
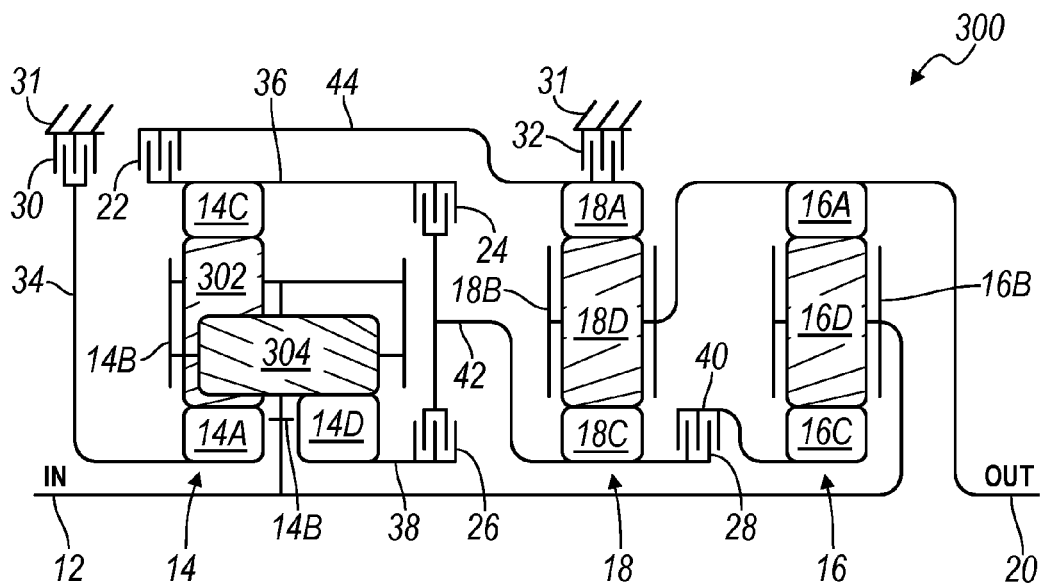
FIG. 5 is a diagrammatic illustration of still another embodiment of the transmission of FIG. 1 according to the principles of the present invention.

Referring now to FIG. 5, a stick diagram presents a schematic layout of another embodiment of a multi-speed transmission 300 according to the principles of the present invention. In FIG. 5, the numbering from the diagrams of FIGS. 1 and 3 are carried over. However, in the transmission 300, the long planet or pinion gears 14E are configured as short planet or pinion gears 302 and the short planet or pinion gears 14F are configured as long planet or pinion gears 304. The short planet gears 302 are each intermeshed with both the sun gear member 14A, the ring gear member 14C, and the long planet gears 304. The long planet gears 304 are each intermeshed with both the short planet gears 302 and the sun gear member 14D.

Figure 6:
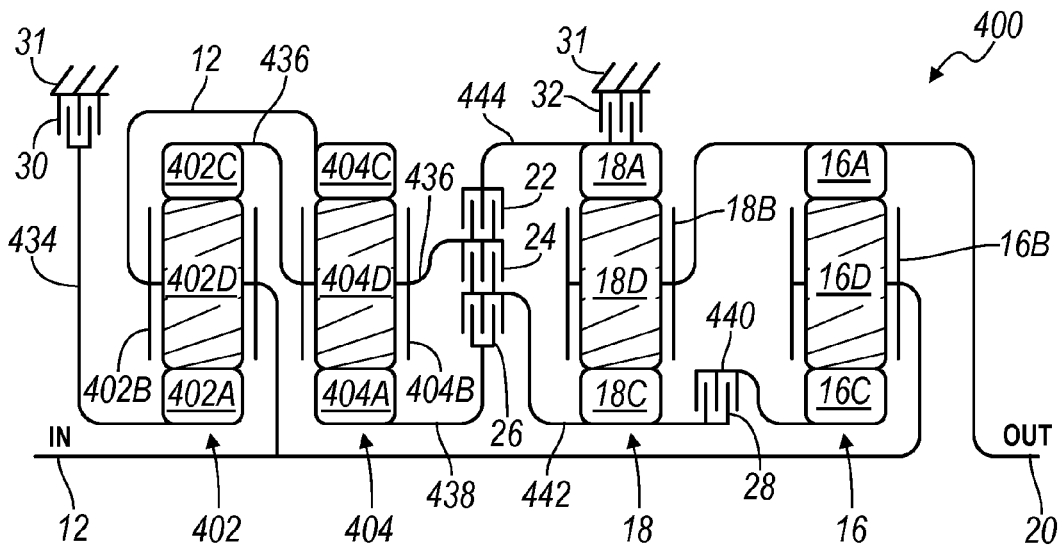
FIG. 6 is a diagrammatic illustration of yet another embodiment of the transmission of FIG. 1 according to the principles of the present invention.

Referring now to FIG. 6, a stick diagram presents a schematic layout of an embodiment of a multi-speed transmission 400 according to the principles of the present invention. In FIG. 6, the numbering from the lever diagram of FIG. 1 is carried over. The clutches and couplings are correspondingly presented whereas the nodes of the gear set assemblies now appear as components of planetary gear sets such as sun gears, ring gears, planet gears and planet gear carriers.

For example, the first gear set assembly 14 is configured as two separate planetary gear sets including a first planetary gear set 402 and a second planetary gear set 404. Therefore, some of the nodes of the first gear set assembly 14 represent multiple components of both the first and second planetary gear sets 402, 404. For example, the first planetary gear set 402 includes a sun gear member 402A, a planet gear carrier member 402B, and a ring gear member 402C. The carrier member 402B rotatably supports a set of planet or pinion gears 402D (only one of which is shown). Each of the planet gears 402D are intermeshed with both the sun gear member 402A and the ring gear member 402C. The second planetary gear set 404 includes a sun gear member 404A, a planet gear carrier member 404B, and a ring gear member 404C. The carrier member 404B rotatably supports a set of planet or pinion gears 404D (only one of which is shown). Each of the planet gears 404D are intermeshed with both the sun gear member 404A and the ring gear member 404C. Therefore, the first node 14A of the first gear set assembly 14 represents the sun gear member 402A. The second node 14B of the first gear set assembly 14 represents the carrier member 402B and the ring gear 404C. The third node 14C of the first gear set assembly represents the ring gear member 402C and the carrier member 404B. The fourth node 14D of the first gear set assembly 14 represents the sun gear member 404A.

The sun gear member 402A is connected for common rotation with a first shaft or interconnecting member 434. The planet gear carrier 402B is connected for common rotation with the input shaft or member 12. The ring gear member 402C is connected for common rotation with a second shaft or interconnecting member 436.

The sun gear member 404A is connected for common rotation with a third shaft or interconnecting member 438. The carrier member 404B is connected for common rotation with the second shaft or interconnecting member 436. The ring gear member 404C is connected for common rotation with the input shaft or member 12.

The second gear set assembly 16 includes a sun gear member 16C, a planet gear carrier member 16B, and a ring gear member 16A. The planet gear carrier member 16B rotatably supports a set of planet or pinion gears 16D (only one of which is shown). The planet gears 16D are each configured to intermesh with both the sun gear member 16C and the ring gear member 16A. The sun gear member 16C is connected for common rotation with a fourth shaft or interconnecting member 440. The carrier member 16B is connected for common rotation with the input shaft or member 12. The ring gear member 16A is connected for common rotation with the output shaft or member 20.

The third gear set assembly 18 includes a sun gear member 18C, a planet gear carrier member 18B, and a ring gear member 18A. The planet gear carrier member 18B rotatably supports a set of planet or pinion gears 18D (only one of which is shown). The planet gears 18D are each configured to intermesh with both the sun gear member 18C and the ring gear member 18A. The sun gear member 18C is connected for common rotation with a fifth shaft or interconnecting member 442. The carrier member 18B is connected for common rotation with the output shaft or member 20. The ring gear member 18A is connected for common rotation with a sixth shaft or interconnecting member 444.

The input shaft or member 12 is continuously connected to an input source, such as an engine (not shown) or a turbine of a torque converter (not shown). The output shaft or member 20 is continuously connected with a motor vehicle output such as a final drive unit or transfer case (not shown).

The torque-transmitting mechanisms, including the first, second, third, and fourth clutches 22, 24, 26, 28 and first and second brakes 30, 32 allow for selective interconnection of the shafts or interconnecting members 434, 436, 438, 440, 442, 444 to other shafts or interconnecting members 434, 436, 438, 440, 442, 444, the members of the gear set assemblies 14, 16, 18, or the stationary member or transmission housing 31. For example, the first clutch 22 is selectively engageable to connect the second interconnecting member 436 with the sixth interconnecting member 444. The second clutch 24 is selectively engageable to connect the second interconnecting member 436 with the fifth interconnecting member 442. The third clutch 26 is selectively engageable to connect the third interconnecting member 438 with the fifth interconnecting member 442. The fourth clutch 28 is selectively engageable to connect the fourth interconnecting member 440 with the fifth interconnecting member 442. The first brake 30 is selectively engageable to connect the first interconnecting member 434 to the stationary member or transmission housing 31 in order to restrict the sun gear member 402A from rotating relative to the housing 31. The second brake 32 is selectively engageable to connect the sixth interconnecting member 444 to the stationary member or transmission housing 31 in order to restrict rotation of the ring gear member 18A.

Referring now to FIG. 7 and with continued reference to FIGS. 2-6, the operation of the multi-speed transmissions 10, 100, 200, 300, 400 will be described. It will be appreciated that transmissions are capable of transmitting torque from the input shaft or member 12 to the output shaft or member 20 in multiple forward speed torque ratios and at least one reverse speed or torque ratio. Each forward and reverse speed or torque ratio is attained by engagement of one or more of the torque-transmitting mechanisms (i.e. first brake 30, second brake 32, first clutch 22, second clutch 24, third clutch 26, and fourth clutch 28), as will be explained below.

FIG. 7 is a truth table presenting the various combinations of torque-transmitting mechanisms that are activated or engaged to achieve the various gear states. An "X" in the box means that the particular clutch or brake is engaged to achieve the desired gear state. Actual numerical gear ratios of the various gear states are also presented although it should be appreciated that these numerical values are exemplary only and that they may be adjusted over significant ranges to accommodate various applications and operational criteria of the transmissions. Of course, other gear ratios are achievable depending on the gear diameter, gear teeth count and gear configuration selected.

For example, a reverse gear is established by engaging or activating the second brake 32, the third clutch 26, and the first clutch 22. Likewise, the ten forward speed or gear ratios are achieved through different combinations of clutch and brake engagement, as shown in FIG. 7, by way of example. FIG. 7 also illustrates multiple clutch and brake engagement options for achieving fourth gear and seventh gear.

It should be appreciated that the shafts or interconnecting members 12, 20, 34, 36, 38, 40, 42, 44, 434, 436, 438, 440, 442, and 444 may each be single unitary members or each may be comprised of multiple interconnected rotatable members without departing from the scope of the present invention.

The description of the invention is merely exemplary in nature and variations that do not depart from the gist of the invention are intended to be within the scope of the invention. Such variations are not to be regarded as a departure from the spirit and scope of the invention.

The following is claimed:

1. A transmission for a motor vehicle comprising:
an input member;
an output member;
a first planetary gear set having a first sun gear, a second sun gear, a carrier member, and a ring gear;
a second planetary gear set having a sun gear, a carrier member, and a ring gear;
a third planetary gear set having a sun gear, a carrier member, and a ring gear;
a first interconnecting member directly connected to the carrier member of the first planetary gear set and to the carrier member of the second planetary gear set;
a second interconnecting member directly connected to the ring gear of the second planetary gear set and the carrier member of the third planetary gear set; and
six torque transmitting mechanisms each selectively engageable to connect one of the sun gears, carrier members, and rings gears with another of the sun gears, carrier members, rings gears and a stationary member, and
wherein the six torque transmitting mechanisms are engaged in combinations of at least three to provide at least ten forward gear ratios and at least one reverse gear ratio between the input member and the output member.

2. The transmission of claim 1 wherein a first of the six torque transmitting mechanisms is selectively engageable to connect the ring gear of the first planetary gear set with the ring gear of the third planetary gear set.

3. The transmission of claim 1 wherein a second of the six torque transmitting mechanisms is selectively engageable to connect the ring gear of the first planetary gear set with the sun gear of the third planetary gear set.

4. The transmission of claim 1 wherein a third of the six torque transmitting mechanisms is selectively engageable to connect the second sun gear of the first planetary gear set with the sun gear of the third planetary gear set.

5. The transmission of claim 1 wherein a fourth of the six torque transmitting mechanisms is selectively engageable to connect the sun gear of the second planetary gear set with the sun gear of the third planetary gear set.

6. The transmission of claim 1 wherein a fifth of the six torque transmitting mechanisms is selectively engageable to connect the first sun gear of the first planetary gear set to the stationary member.

7. The transmission of claim 1 wherein a sixth of the six torque transmitting mechanisms is selectively engageable to connect the ring gear of the third planetary gear set to the stationary member.

8. The transmission of claim 1 wherein the input member is connected for common rotation to the carrier member of the first planetary gear set and the carrier member of the second planetary gear set via the first interconnecting member.

9. The transmission of claim 1 wherein the output member is connected for common rotation to the ring gear of the second planetary gear set and the carrier member of the third planetary gear set.

10. The transmission of claim 1 wherein the first planetary gear set includes a set of long planetary gears and a set of short planetary gears each supported by the carrier member, and wherein the long planetary gears are each in mesh with the first sun gear, the ring gear, and the short planetary gears, and wherein the short planetary gears are each in mesh with the long planetary gears and the second sun gear.

11. The transmission of claim 1 wherein the first planetary gear set includes a set of stepped planetary gears each having a large diameter portion and a small diameter portion and includes a set of non-stepped planetary gears, wherein each of the stepped planetary gears are meshed with the first sun gear at the large diameter portion and are each meshed with both the ring gear and the non-stepped planetary gears at the small diameter portion, and wherein each of the non-stepped planetary gears are meshed with both the stepped planetary gears and the second sun gear.

12. The transmission of claim 1 wherein the first planetary gear set includes a set of long planetary gears and a set of short planetary gears each supported by the carrier member, and wherein the long planetary gears are each in mesh with the second sun gear and the short planetary gears, and wherein the short planetary gears are each in mesh with the long planetary gears, the first sun gear, and the ring gear.

13. A transmission for a motor vehicle comprising:
an input member;
an output member;
a first planetary gear set having a first sun gear, a second sun gear, a carrier member, and a ring gear;
a second planetary gear set having a sun gear, a carrier member, and a ring gear;
a third planetary gear set having a sun gear, a carrier member, and a ring gear;
a first torque transmitting mechanism selectively engageable to connect the ring gear of the first planetary gear set with the ring gear of the third planetary gear set;
a second torque transmitting mechanism selectively engageable to connect the ring gear of the first planetary gear set with the sun gear of the third planetary gear set;
a third torque transmitting mechanism selectively engageable to connect the second sun gear of the first planetary gear set with the sun gear of the third planetary gear set;
a fourth torque transmitting mechanism selectively engageable to connect the sun gear of the second planetary gear set with the sun gear of the third planetary gear set;
a fifth torque transmitting mechanism selectively engageable to connect the first sun gear of the first planetary gear set to the stationary member;
a sixth torque transmitting mechanism selectively engageable to connect the ring gear of the third planetary gear set to the stationary member, and
wherein the six torque transmitting mechanisms are engaged in combinations of at least three to provide at least ten forward gear ratios and at least one reverse gear ratio between the input member and the output member.

14. The transmission of claim 13 further comprising a first interconnecting member directly connected to the carrier member of the first planetary gear set and to the carrier member of the second planetary gear set.

15. The transmission of claim 13 further comprising a second interconnecting member directly connected to the ring gear of the second planetary gear set and the carrier member of the third planetary gear set.

16. The transmission of claim 13 wherein the input member is connected for common rotation to the carrier member of the first planetary gear set and the carrier member of the second planetary gear set via the first interconnecting member.

17. The transmission of claim 13 wherein the output member is connected for common rotation to the ring gear of the second planetary gear set and the carrier member of the third planetary gear set.

18. The transmission of claim 13 wherein the first planetary gear set includes a set of long planetary gears and a set of short planetary gears each supported by the carrier member, and wherein the long planetary gears are each in mesh with the first sun gear, the ring gear, and the short planetary gears, and wherein the short planetary gears are each in mesh with the long planetary gears and the second sun gear.

19. The transmission of claim 13 wherein the first planetary gear set includes a set of stepped planetary gears each having a large diameter portion and a small diameter portion and includes a set of non-stepped planetary gears, wherein each of the stepped planetary gears are meshed with the first sun gear at the large diameter portion and are each meshed with both the ring gear and the non-stepped planetary gears at the small diameter portion, and wherein each of the non-stepped planetary gears are meshed with both the stepped planetary gears and the second sun gear.

20. The transmission of claim 13 wherein the first planetary gear set includes a set of long planetary gears and a set of short planetary gears each supported by the carrier member, and wherein the long planetary gears are each in mesh with the second sun gear and the short planetary gears, and wherein the short planetary gears are each in mesh with the long planetary gears, the first sun gear, and the ring gear.

* * * * *